ABSTRACT

United States Patent [19]
Helander

[11] 3,835,972
[45] Sept. 17, 1974

[54] ADJUSTING COLLAR FOR SINGLE REVOLUTION SPRING CLUTCH
[75] Inventor: Elton L. Helander, Guilford, Conn.
[73] Assignee: Helander Products, Inc., Clinton, Conn.
[22] Filed: Dec. 26, 1972
[21] Appl. No.: 318,572

[52] U.S. Cl................................ 192/26, 192/12 BA
[51] Int. Cl.............................................. F16d 11/06
[58] Field of Search ...... 192/26, 33 C, 81 R, 12 BA

[56] References Cited
UNITED STATES PATENTS
2,922,220  1/1960  Sacchini......................... 192/12 BA
3,373,851  3/1968  Baer............................... 192/12 BA

*Primary Examiner*—Samuel Scott
*Assistant Examiner*—Wesley S. Ratliff, Jr.
*Attorney, Agent, or Firm*—McCormick, Paulding & Huber

[57] ABSTRACT

The single revolution spring clutch comprises a spring wrapped around adjacent input and output hubs, a release collar for releasing the spring from coupling engagement with the input hub when the collar is stopped from rotating with the clutch assembly and a clamp type adjusting collar. The adjusting collar is clamped on the output hub and coupled, by means of a pin and slot, to the release collar. The angular relationship between the release collar and the output hub can be conveniently varied after the clutch is mounted on the shaft of a machine. The adjusting collar is clamped to that end of the spring which is wrapped on the output hub and serves to clamp this end of the spring to the output hub. The adjustment is accomplished by loosening the adjusting collar, rotating the release collar to the desired position and retightening the adjusting collar.

1 Claim, 2 Drawing Figures

PATENTED SEP 17 1974 3,835,972

ADJUSTING COLLAR FOR SINGLE REVOLUTION SPRING CLUTCH

BACKGROUND OF THE INVENTION

This invention relates generally to spring clutches and more particularly to adjusting collars for single revolution spring clutches. Basically this type of clutch consists of a spring which is wrapped with a slight interference fit around two adjacent hubs one of which is a driving or input hub and the other a driven or output hub. Normally the input hub rotates continuously and drives the output hub. An annular release collar has a radially outwardly projecting lug for engagement by an actuator. The release collar also includes an inwardly open slot which engages a tang on one end of the spring. When the lug is stopped by the actuator the spring releases the output hub, which then comes to rest very quickly while the input hub continues to rotate. After the clutch is mounted on the shaft of a machine it is desirable to be able to adjust the angular relationshp between the relationship collar lug and the output hub.

For example, the angular phase of a driven cam in a machine may require a precise adjustment. Also at high speeds or under very heavy inertial loads in some machinery the output hub tends to overtravel the input hub when the release collar is arrested. This may damage a typical spring clutch by unwinding the spring excessively, causing the output shaft not to stop at the same point from cycle to cycle. Prior art adjusting collars are generally fixed to the output hub, by means of a set screw, even in those devices wherein the release collar is coupled to the adjusting collar by a pin riding in a slot the foregoing disadvantages still obtain. This is because the set screw holding the adjusting collar to the output hub must carry all of the overtravel stopping impact load. In attempting to prevent relative movement of these prior art adjusting collars with respect to an output hub, the set screw must be tightly embedded into the hub thereby marring the hub's surface and preventing further fine adjustment.

The present invention provides a single revolution spring clutch having an adjusting collar which may be clamped firmly in adjusted position to one end of the spring, which spring is thereby clamped to the output hub. Thus, my adjusting collar overcomes the foregoing deficiency of the typical set screw collar, being capable of unlimited fine adjustments, and also serving to clamp one end of the spring to the output hub.

SUMMARY OF THE INVENTION

This invention resides in a single revolution spring clutch which utilizes a clamp type adjusting collar for adjusting the angular relationship between the release collar and the output hub. This type of collar is preferably clamped directly onto the end of the spring which is to be secured to the output hub, and exerts a uniform radial force on the spring and the hub, thereby creating a stronger bond between the two. The uniform clamping action exerted by the collar also prevents damage to either the spring or hub and permits repeated fine adjustments of the release collar.

DETAILED DESCRIPTION

Figure 1:
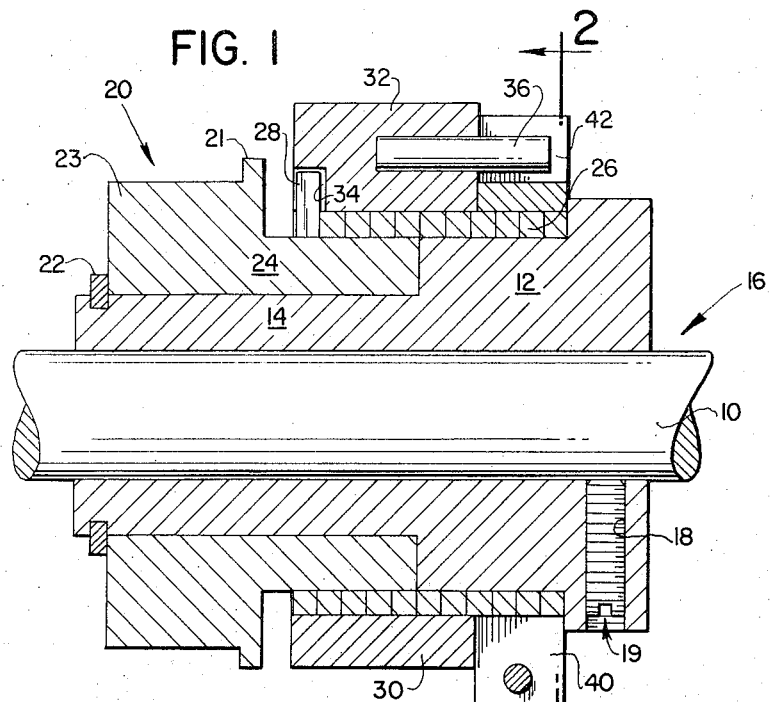
FIG. 1 is a cross sectional view of a shaft mounted clutch which embodies the present invention.

A typical application of the spring clutch utilizing the present invention is shown in FIG. 1. The clutch assembly is mounted on a machine shaft 10, which is to be selectively driven through the clutch. The clutch includes output hub 16 which is fastened to the shaft 10 by means of a conventional set screw 19. The set screw 19 is threadably received in a tapped hole 18. It should be noted that other conventional mounting means might be employed. For example, keyway or cross hole mounting might also be used in place of the set screw 19. The input hub 20 includes a drive portion 23, having a flange 21 for receiving a sprocket or other suitable driving means, and a drum portion 24 of smaller diameter for receiving a helically wrapped spring 26. The input hub 20 is rotatably mounted on the output hub 16.

The output hub 16 includes a drum portion 12 of the same diameter as drum 24, and also includes a shaft portion 14. The shaft portion 14 provides a bearing surface on which the input hub 20 can rotate. The fit between the shaft portion 14 and the input hub 20 is sufficiently loose to permit the individual independent rotation of one hub relative to the other. The input hub 20 is held in axial position on the output hub 16 by a conventional steel retaining ring 22, set in a circumferential groove in the shaft portion 14 of the output hub. The spring 26 is wrapped with a slight interference fit around the two adjacent drum portions 24 and 12 of the hubs. As the input hub 20 rotates in the driving direction it cause the spring to twist helically, thereby contracting radially, to grip the drum portion of both hubs. The hubs are thus coupled and the output hub is driven at the same speed as the input hub.

A release collar 30 is loosely mounted on the spring and completely encircles it but normally rotates with the clutch assembly. This collar 30 has a radially projecting lug 32 on its outer surface and an inner slot 34 which engages a radial tang 28 on the input end of the spring 26. Under normal operating conditions the clutch is constantly driving. By interrupting the rotation of the collar 30, however, the clutch is released. This may be accomplished with a lever or sliding actuator bar 38 contacting the lug 32 on the collar 30. Such a bar is controlled mechanically, manually or by an electric solenoid. In a typical arrangement for example, a spring loaded bar 38 could cause the clutch to be normally released, by withdrawing the bar with a solenoid the clutch would be electrically engaged. When the lug 32 is stopped by the bar 38 the spring 26 is released from contact with the input hub thus causing the output member to come to rest while the input continues to rotate.

Figure 2:
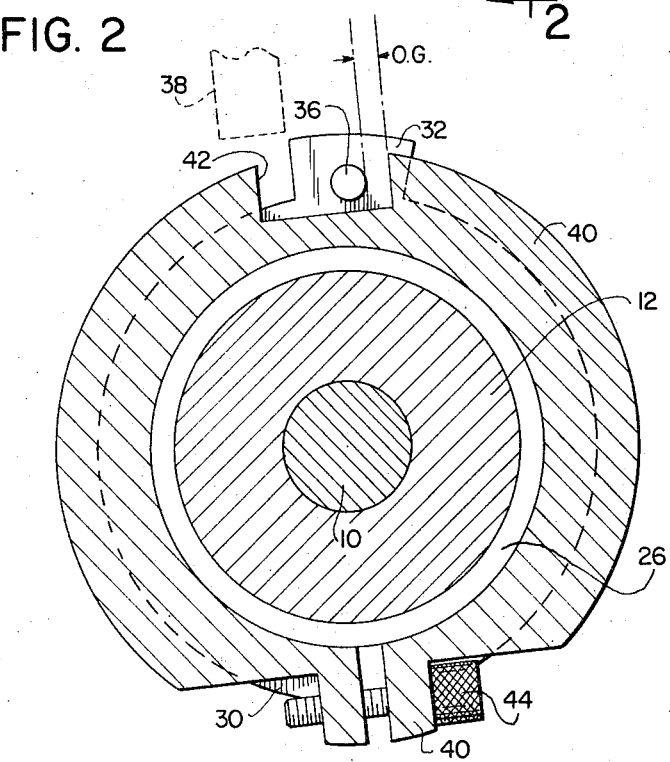
FIG. 2 is a view in cross section of the clutch in FIG. 1, being taken along the line 2—2 of that view.

After the clutch is mounted on the shaft 10 in a machine, it may be desirable to adjust the angular relationship between the release collar lug 32 and the output hub 16. A typical requirement of this might be to permit the precise adjustment of the angular phase of a driven cam. Furthermore, at high speeds or with heavy inertial loads, the output hub tends to overtravel the input hub when the release collar is arrested. This can cause damage to the clutch by unwinding the spring, or the output shaft may not stop at the same point from cycle to cycle. To remedy these conditions an adjustment collar 40 is clamped on the clutch assembly as shown in FIGS. 1 and 2. In the preferred embodiment, this collar is positioned directly over the spring, thereby clamping the spring to the output hub. This configuration permits a shorter clutch assembly with the resulting decrease in size and weight.

As may be seen from the drawing, the adjustment collar 40 is linked to the release collar 30 by means of a pin and slot connection. An axially extending pin 36 is secured in the release collar, and projects outwardly therefrom into a radially outwardly open slot 42 in the adjustment collar 40. The pin 36 provides a positive stop for the output hub, but only after a predetermined gap O. G. To illustrate how this overtravel gap O. G. works, note that in normal operation the entire clutch assembly consisting of input and output hubs, spring, release collar and adjustment collar are rotating together in the same direction and at the same speed. When the release collar is arrested by the actuating bar 38 it is brought immediately to rest. The output hub carrying the spring and the adjustment collar tends to continue to rotate, however, due to inertia. The pin 36 prevents rotation of these latter components, except for the overtravel, by coming in contact with one side of the adjustment collar slot 42. The amount of overtravel may be adjusted by changing the size of the overtravel gap as shown as O. G. in FIG. 2.

The complete adjustment procedure is as follows; first, after the clutch is installed, and secured to a shaft 10 by a set screw or the like, a clamping screw 44, used to fasten the collar to the hub, is loosened. Next, with the shaft 10 in the desired position the release collar 30 is rotated to the proper alignment with the external actuating bar. The adjustment collar 40 is then rotated to the desired overtravel gap. A gauge may be inserted at this point for more precise adjustment. Finally, the clamping screw 44 is securely tightened. Thus, the output hub and shaft are adjusted angularly relative to the release point and also to a predetermined stopping point.

The clamp type adjustment collar illustrated in this preferred embodiment has several distinct advantages over other types of adjustment collars. By virtue of the fact that when tightened it exerts a uniform radial clamping force on the spring it serves to hold both this end of the spring, and also to hold the desired adjustment. The uniform clamping action of this collar is contrasted with that of a conventional set screw or other device and prevents damage to the hub surface under high impact or inertial loads, thereby assuring repeated fine adjustments of the collar, and longer life for the resulting spring clutch assembly.

It should be noted that the term "single revolution clutch" as used herein is intended to include either a clutch which can be stopped at one or more angular positions, as would be possible should several actuators be arranged around the release collar 30, or as if more than one lug 32 were provided on said collar 30.

Another obvious variation, to be readily apparent to one skilled in this art, would be to merely reverse the function of the output and input hubs. The description terms "output" and "input" as used in the claims is intended solely for reference purposes, and could be read in an opposite context.

I claim:
1. A spring clutch of the type adapted to be stopped at a particular angle position comprising:
   a. an output hub including a drum portion,
   b. an input hub adapted to being continuously driven in one direction, and rotatably mounted on said output hub, with a drum portion adjacent to and coaxially aligned with said output hub drum portion,
   c. a helical spring on said adjacent drum portions and having an interference fit with respect thereto, said spring including a tang at one end, said one end of said spring being associated with said driven input hub drum portion,
   d. a split collar and clamping screw for clamping several turns at the opposite end of said spring to said output hub drum portion, said screw serving to clamp said split collar onto said spring, said split collar defining a radially outwardly open slot for said pin and slot connection,
   e. a release collar loosely received on said spring and having a recess for receiving said tang to cause said collar to rotate with said spring, said release collar having a projecting lug for engagement with a non-rotating member external to the clutch for disengaging said spring clutch, and wherein said release collar carries a pin projecting axially into said split collar slot and adapted to abut one radially extending side of said split collar slot when said lug is stopped by a non-rotating member or the like, said split collar thereby serving as an adjusting collar for said spring and said release collar to allow the angular orientation of the stopped output hub to be preadjusted and also to allow preadjustment of the overtravel gap defined between said pin and said one side of said slot.

\* \* \* \* \*